United States Patent
Miura et al.

[11] Patent Number: 5,938,868
[45] Date of Patent: Aug. 17, 1999

[54] TIRE FOR VEHICLE

[76] Inventors: Isago Miura, 1-4-19 Honcho, Asaka-shi Saitama-ken 351; Takashi Miura, 1-14-1 Hiyoshi, Kohoku-ku, Yokohama-shi, Kanagawa-ken 223, both of Japan

[21] Appl. No.: 08/881,136

[22] Filed: Jun. 24, 1997

[30] Foreign Application Priority Data

Jun. 28, 1996 [JP] Japan .................................. 8-168739

[51] Int. Cl.$^6$ .................................................. B60C 5/20
[52] U.S. Cl. .................. 152/331.1; 152/327; 152/DIG. 5
[58] Field of Search .............................. 152/415, DIG. 5, 152/336.1, 331.1, 333.1, 339.1, 340.1, 327, 328, 329

[56] References Cited

U.S. PATENT DOCUMENTS

| | | | |
|---|---|---|---|
| 497,965 | 5/1893 | Owen | 152/DIG. 5 |
| 587,009 | 7/1897 | Loisel | 152/DIG. 5 |
| 851,960 | 4/1907 | Pfleumer | 152/DIG. 5 |
| 852,130 | 4/1907 | Magowan | 152/DIG. 5 |
| 2,304,776 | 12/1942 | Brunner | 152/415 |
| 2,311,901 | 2/1943 | Palko | 152/415 |
| 2,785,727 | 3/1957 | Bobard | 152/DIG. 5 |
| 2,929,432 | 3/1960 | Kominic et al. | 152/415 |
| 4,169,497 | 10/1979 | Tsuruta | 152/DIG. 5 |
| 4,298,047 | 11/1981 | Bobard | 152/DIG. 5 |

FOREIGN PATENT DOCUMENTS

368582  12/1906  France .

*Primary Examiner*—Francis J. Lorin
*Attorney, Agent, or Firm*—Flynn, Thiel, Boutell & Tanis, P.C.

[57] ABSTRACT

The tire for a vehicle comprises a main body of the tire made from a rubber composite material and a rim to form a toroidal space therein, accommodates a toroidal pneumatic tube expandable due to its elasticity in the space for liquid, and the pneumatic tube has a smaller volume than that of a form obtained by depressing the space for liquid to a desired level by a road surface at the point of time when the tube is filled with air at a specified pressure required for supporting a load imposed on the tire, and the space for liquid in the depressed form which is outside of the tube is filled with liquid so that a desired ground contact area of the tire can be obtained under the load.

7 Claims, 7 Drawing Sheets

TIRE FOR VEHICLE

FIELD OF THE INVENTION

The present invention relates to a tire used for a motor car or other mobile vehicles, and more particularly, to a tire for a vehicle having a ground contact area capable of being set to a desired value.

BACKGROUND OF THE INVENTION

This type of tire is expected to be used for cars which run freely at substantially high speeds on a paved road, an unpaved road, a wet road, or an icy road or the like. Important performances for the purposes as described above are cornering performance, shock-absorbing performance, friction performance, and performance of running with low noises or the like. It is important for obtaining these performances that each of the tires should contact the road with a large ground contact area, namely, at a comparatively low ground pressure. Also, in a case where a car runs on a snowy road surface or an icy road surface, the tires, especially during driving, are slippery, so that the air pressure of the tires is lowered to make the ground contact area larger, ordinary types of tire are changed to so-called spike tires, or the tires are covered with chains for driving thereon.

Conventional types of tires have difficulties keeping their desired ground contact area, even if a driver wants to reduce the air pressure of each tire to make the ground contact area thereof larger, the air pressure of the tire cannot excessively be reduced and there are some limits in reducing the air pressure in each tire because the air pressure is one of the most important elements for maintaining the form and functions of the tire. The spiked tire and the use of chain are attended with troubles such as dust or the like produced in the case where a car with spiked tires or with tires covered with chains runs on an ordinary road other than a snowy road surface or an icy road surface and, in addition, it is troublesome to change the tires or to attach and detach the chains thereto and therefrom.

OBJECTS AND SUMMARY OF THE INVENTION

The present invention was made for solving the problems as described above, and it is an object of the present invention to provide a tire for a vehicle having a desired ground contact area thereof, namely, having a desired ground pressure thereof regardless of the air pressure in the tire.

To achieve the above object, the tire for a vehicle according to the present invention comprises a basic body of the tire made from a rubber composite material and a rim for forming a shielded toroidal liquid space and also has a toroidal pneumatic tube which is expandable due to its elasticity and accommodated in the liquid space, and the pneumatic tube is made smaller in its volume, at a point of time when the tube is filled with air at the specified pressure required for supporting a load imposed on the tire, than that of a form obtained by depressing the liquid space to a desired level by the road surface, and the liquid space in the depressed form, which is an outer side of the tube, is filled with a liquid so that a desired ground contact area of the tire can be obtained under the load.

Also, to achieve the above object, a tire for a vehicle according to another aspect of the present invention comprises a basic body made from a rubber composite material and a rim for forming a shielded toroidal liquid space, and the liquid space in the form obtained when the tires are attached to a vehicle and depressed by a road surface to a desired level is filled with a liquid or with a liquid and a small amount of air, so that the desired ground contact area of the tire can be obtained under the load.

With the tire for a vehicle according to the present invention, the ground contact area of the tire can freely be set regardless of the air pressure in the tire as described above. Namely, it is possible to obtain a tire with a wide ground contact area; namely with a low ground pressure, which cannot be realized with conventional technology, so that it is possible to remarkably improve the frictional performance, cornering performance, and performance of running without noises or the like. For this reason, the roadholding ability of the tire increases, and the braking distance is reduced, so that a car equipped with the tires can run with stability on a wet road, an icy road, and a snowy road. Further, by reducing the amount of liquid in the space and keeping a large ground contact area of the tire by the same portion as that of the reduced liquid, the tire can take the place of the conventional types of spiked tires, tires covered with a chain, or studless tires or the like, each of which is used when a car runs on an icy road or a snowy road. In addition, it is easy to change the ground contact area, and to increase the ground contact area by, for example, a small amount of liquid simply being drained therefrom, and on the contrary, to reduce the ground contact area by a small amount of water being poured in under a pressure.

DETAILED DESCRIPTION OF THE PREFERRED EMBODIMENTS

Figure 1:
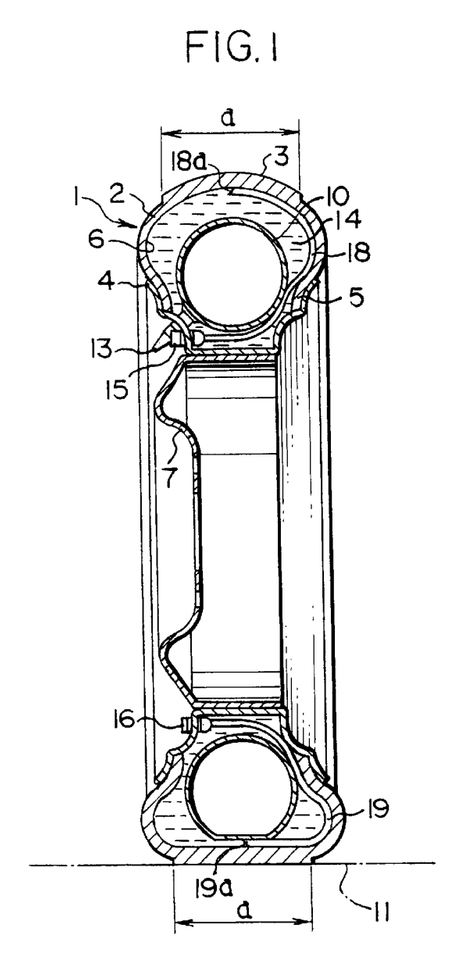
FIG. 1 is a vertical sectional front view showing a tire according to one embodiment of the present invention.
Figure 2:
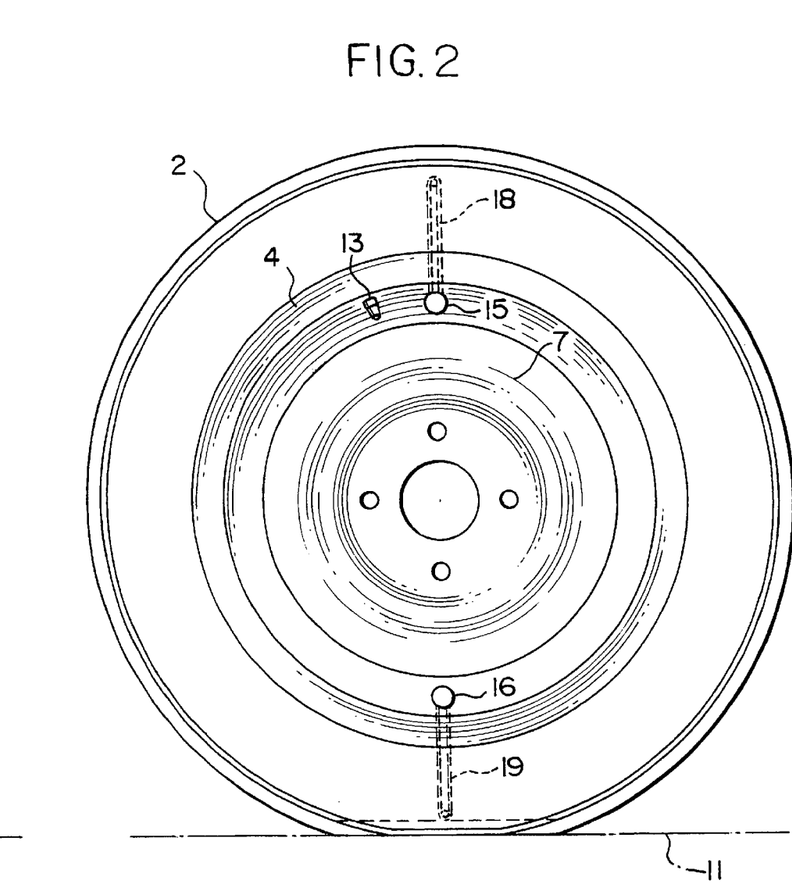
FIG. 2 is a side view of the tire shown in FIG. 1.

FIGS. 1 and 2 show a tire according to one embodiment of the present invention. The reference numeral 1 indicates a tire made from a rubber composite material incorporating therein bead wires, a carcass, a breaker, or a belt or the like, each of which is not shown herein, and having a main body of the tire 2 comprising a bead section, a rim cushion section, a side wall section, a shoulder section, and a crown section. The reference numeral 3 indicates the crown section having a width a, and the reference numeral 4 indicates a rim which is air-tightly bonded to bead sections 5 provided in both edge sections in the side of inner peripheral surface of the main body thereof 2 so that the bead sections are provided in an inward direction to be superimposed on the rim, and with this bond, a toroidal liquid space 6 in a shielded state is formed between the rim 4 and main body of the tire 2. The reference numeral 7 indicates a disk mounted on the inner peripheral surface.

Accommodated in the liquid space 6 is a toroidal pneumatic tube 10 as a pneumatic bag which is expandable due to its elasticity. This pneumatic tube 10 maintains, when filled to a specified pressure required for supporting a load imposed on the tire 1, for instance, air under a pressure in a range from $1.5 \text{ kg/cm}^2$ to $10 \text{ kg/cm}^2$ or more, a stable tubular form, and the volume thereof at the point of time becomes smaller than that of a form obtained by depressing the liquid space 6 as low as the desired level by a road surface 11. Any commercial tube made of a rubber composite body may be used by adjusting the form and wall thickness thereof for this type of pneumatic tube 10, or any plastic material having an appropriate tensile strength and elasticity or the like may be used for the preparation thereof. In short, any quality of a material will do as long as expansion/contraction due to its elasticity is possible. The reference numeral 13 indicates an air valve used for filling air in the pneumatic tube 10 or discharging the air therefrom and projects from the rim 4 to the outside.

The liquid space 6 constituting the outer side of the pneumatic tube 10 is filled with a liquid 14 using a liquid valve described later so that the tire 1 can obtain a desired ground contact area under the load. The liquid 14 is used for its property as an incompressible fluid. It is preferable to use water if there is no possibility of the liquid being frozen, and an antifreeze solution or some other liquid having a low melting point is used if there is a possibility for the water to be frozen. The quantity of the liquid 14 is the quantity required for filling the remaining portion therewith obtained by subtracting the volume of the pneumatic tube 10 at the point in time when air is filled therein from the volume of a form obtained by depressing the tire 1. However, in addition to the liquid, a small amount of air may be mixed therein. The reference numerals 15, 16 indicate liquid valves and are used for filling the liquid 14 in the liquid space 6, and it is clear from FIG. 2 that the valves are provided substantially opposite to each other in a radial direction on the line passing through the center of the rim 4.

The reference numerals 18, 19 indicate liquids conduits communicating with the liquid valves 15, 16 respectively and provided in the liquid space 6, each of which is made from a material such as a flexible pipe or the like, and opening sections 18a, 19a at the tips thereof are provided so that each of the conduits is positioned in the side of the outer peripheral wall by surrounding the pneumatic tube 10 as much as halfway therearound. The liquid conduits 18, 19 smoothly replace air with liquid and vice versa required for filling liquid or discharging it because, when one of the opening section 18a at the tip thereof positions in the upper side of the tube in the depressed form, the other opening section 19a at the tip thereof is positioned at the lowest position because of the positional relation between the liquid valves 15, 16 as described above. The liquid conduits 18, 19 can also be used by replacing one portion of the flexible pipe with a band-shaped rubber material or some other material to form a liquid duct 14 and adhering it onto the inner peripheral wall of the main body thereof 2. The pneumatic tube 10 accommodated in the space 6 for the liquid can easily move in the depressed form, and in a case where it is unstable, for instance, the peripheral surface of the pneumatic tube 10 may be fixed to the inner peripheral wall of the main body of the tire 2 or of the rim 4 at a plurality of points thereof or at points as widely spaced as possible so that the tube will not move therein.

There is no particular order in steps of opening/closing the air valves 13 and liquid valves 15, 16 when air is filled in or discharged from the pneumatic tube 10 or when the liquid is filled in or discharged from the liquid space 6. It may be convenient to take the steps of, at first, filling a liquid in the round tire before being depressed and, then discharging the liquid therefrom as the tire is being depressed to arrive at a desired level in place of the steps of, at first, depressing the tire, and then filling the liquid therein. It should be noted that the filling of a liquid is not restricted to the method of opening the upper valve 15 for the liquid and filling a liquid from the lower liquid valve 16 and can be executed by sucking the liquid from the upper valve 15 and sucking up the liquid through the lower liquid valve 16.

Figure 3:
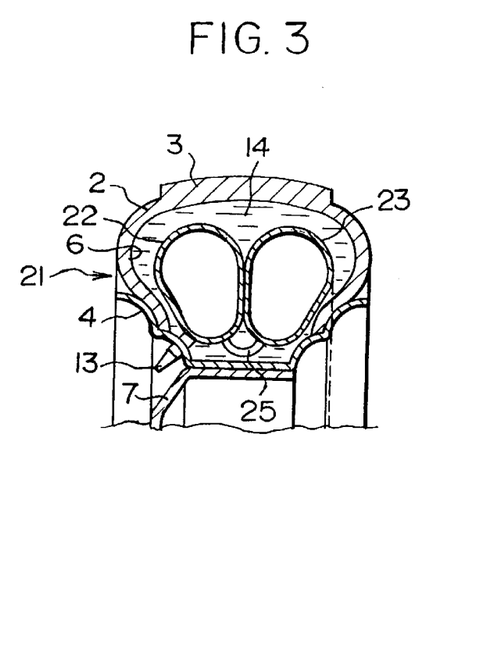
FIG. 3 is an enlarged vertical sectional front view showing a key section of a tire according to another embodiment of the present invention.

FIG. 3 shows a tire according to another embodiment of the present invention. This tire 21 has two units of pneumatic tubes 22, 23 accommodated in a liquid space 6. Both the pneumatic tubes 22, 23 are connected to each other through a communicating tube 25 and are filled with air having the same pressure. The total volume of the pneumatic tubes at the point of time when the air at a specified pressure has been added must be smaller than that of the remaining space described in the above embodiment. The liquid valves are omitted in FIG. 3, and the tire according to this embodiment also includes the liquid valves and another configuration thereof is the same as that in the embodiments shown in FIGS. 1 and 2. Two units of pneumatic tubes are accommodated therein in this embodiment, but the number is not necessarily two, and three units or more tubes may be used. The pneumatic tubes 22, 23 may separately have an air valve respectively in place of the communicating tube 25 and be provided in a state where it projects from the rim 4 to the outer side thereof respectively.

Figure 4:
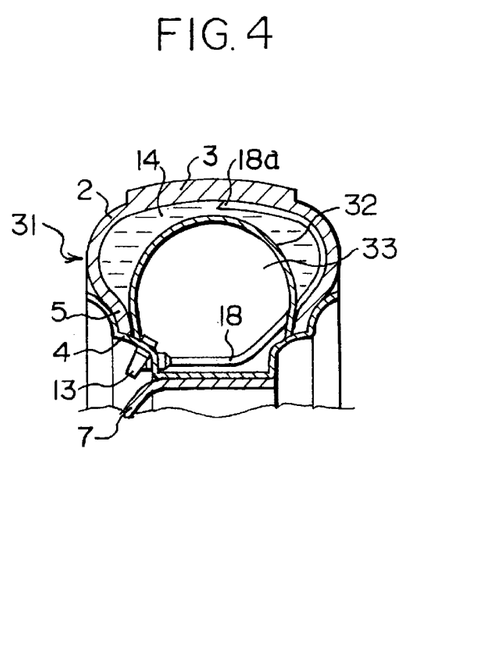
FIG. 4 is an enlarged vertical sectional front view showing a key section of a tire according to another embodiment of the present invention.

FIG. 4 shows a tire according to still another embodiment of the present invention. This tire 31 has a ring-shaped membrane body 32 in a form looking as if the pneumatic tube 10 is cut in the axial direction at one portion in the direction of the perimeter of the tube. The membrane body 32 is expandable due to the elasticity thereof as is the pneumatic tube, and both edges thereof are air-tightly connected to an inner peripheral wall of the main body of the tire at points close to the bead section 5. With this connection, a toroidal air space 33 is formed by the membrane body 32 and the rim 4 in the shielded state, so that the air space is filled with an air at a specified pressure for supporting a load imposed on the tire. In this case, the conduit 18 (19) is provided by penetrating the membrane 32, so that appropriate shielding is given to the penetrating section so that air or liquid is not leaked from the penetrating section. The air space 33 is formed by the membrane body 32 and the rim 4 as described above in this embodiment in place of the pneumatic tube, however, the configuration other than the above section is the same as those in FIGS. 1 and 2.

Figure 5:
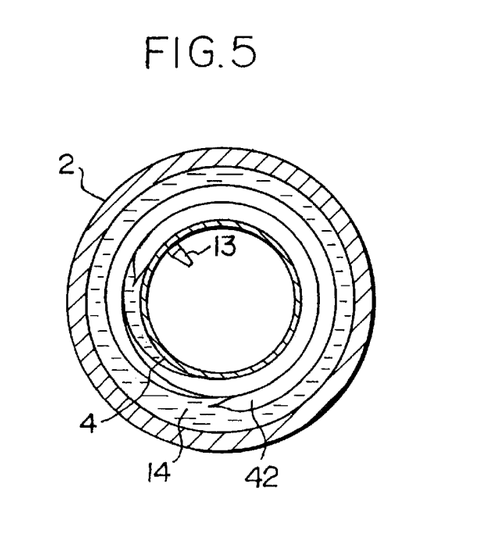
FIG. 5 is a vertical sectional side view showing a key section of a pneumatic tube according to a modified example thereof.
Figure 6:
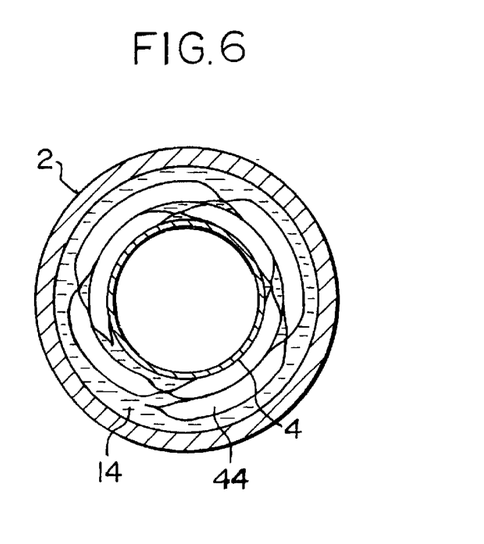
FIG. 6 is a vertical sectional side view showing a key section of a pneumatic tube according to a modified example thereof.

FIGS. 5, 6 show modified examples of the pneumatic tube. The pneumatic tube is not always required to be a toroidal tube separately provided therein as in the embodiments shown in FIGS. 1, 2 or FIG. 3, but a tube formed by sealing both edges of the lengthy tube 42 as shown in FIG. 5 and winding around the rim 4 for an arbitrary number of turns may also be used, and a tube formed by blocking a lengthy tube 44 at some points, as shown in FIG. 6, in a state in which the tube is filled with air having a desired air pressure, and providing the tube comprising sections isolated as described above in the depressed form.

Figure 7:
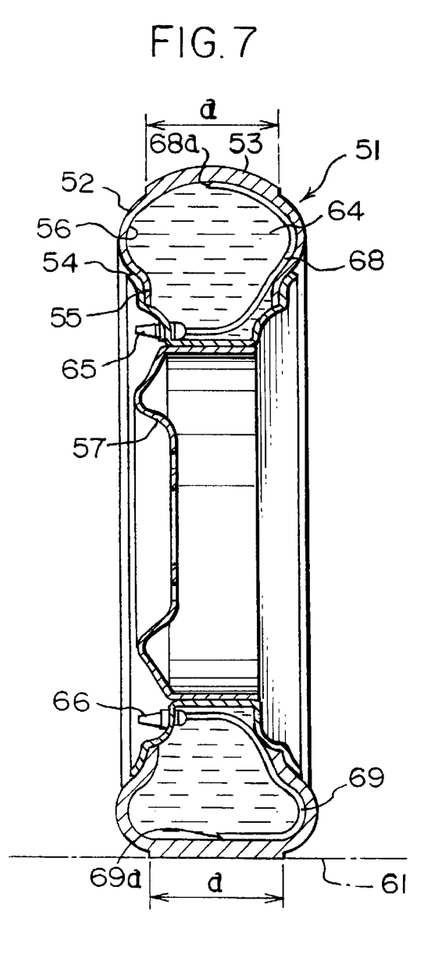
FIG. 7 is a vertical sectional front view showing a tire according to one embodiment of another feature of the present invention.
Figure 8:
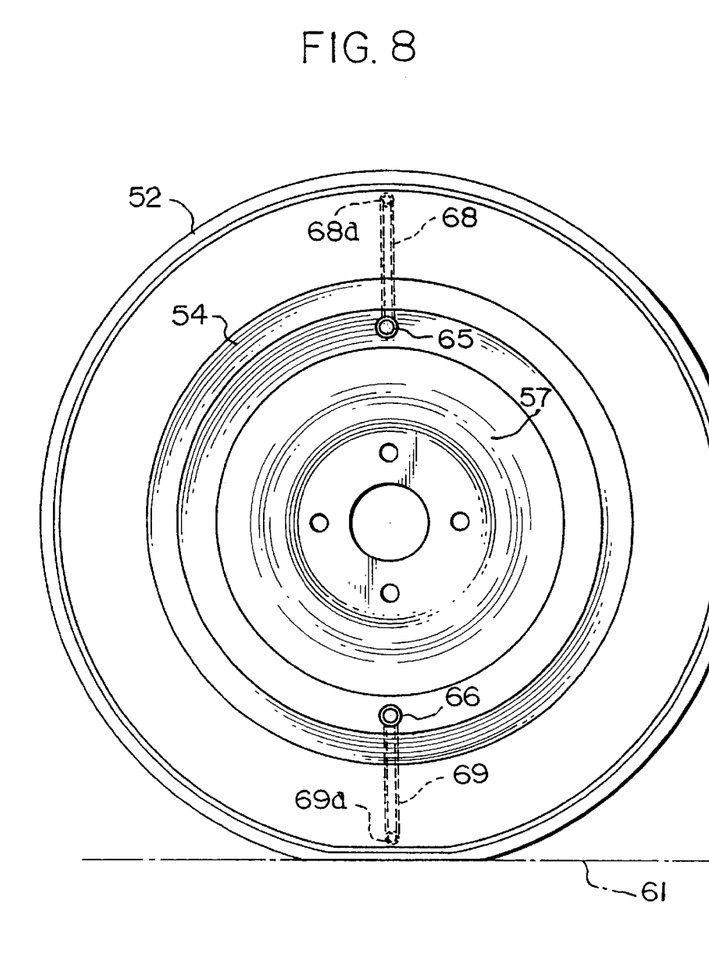
FIG. 8 is a side view of the tire shown in FIG. 7.

FIGS. 7, 8 show a tire according to one embodiment of another aspect of the present invention. In this tire 51, a rim 54 is air-tightly connected to a bead section 55 at both edge sections in the side of inner peripheral surface of a main body of the tire 52, and with this engagement, a toroidal liquid space 56 is formed between the rim 54 and the main body 52 of the tire in its shielded state. When the tires 51 are attached to a vehicle, the liquid space 56 is depressed to a desired level by a road surface 61 as shown in the figure, but the space is filled with the liquid 64 as an incompressible fluid so that a desired contact area of the tire can be maintained under the load. Water is used as the liquid 64 if it has no possibility of being frozen, and if it has the possibility, for instance, an antifreeze solution or any other liquid having a low melting point is used therefor. A liquid of a single substance or some other emulsion including a mixed liquid or the like may be used as the liquid 64. Some additives such as soap or some other substance are sometimes added to the liquid 64 for the purpose of improving the viscosity or other physical characteristics thereof. The liquid space 56 to be depressed is filled with one of various types of liquids as described above, however, the liquid space 56 may be used by being filled with a small amount of air other than the liquid, whereby the shock-absorption of the tire can also be complemented. The reference numerals 65, 66 indicate liquid valves for filling the liquid 64 or a small amount of air in the liquid space 56, and it is clear from FIG. 8 that the valves are provided at positions substantially opposite to each other toward the center of the rim 54.

The reference numerals 68, 69 indicate liquid conduits communicating with the liquid valves 65, 66 and provided in the liquid space 56, each of which is made from a material such as a flexible pipe or the like, and opening sections 68a, 69a at the tips thereof are provided in positions close to the peripheral wall of the liquid space 56 opposite to each other to the center of the tire 51, and it is possible to smoothly replace air with a liquid or vice versa when filling a liquid or discharging it because, when one of the opening section 68a at the tip thereof is positioned in the upper side of the tire 51, the other opening section 69a at the tip thereof is positioned at the lowest position. One of the liquid conduits 68, 69 may be omitted. The liquid conduits 68, 69 can also be used by replacing one portion of the flexible pipe with a band-shaped rubber material or some other material to keep a liquid duct 64 and adhering it onto the inner peripheral wall of the main body 52.

There may be employed a method of filling the liquid 64 into the liquid space 56 in a state in which the tire 51 is detached from the vehicle, attaching it to the vehicle, and then stopping the discharge of the liquid from the liquid valve 65 when the discharged amount of the liquid reaches a desired level, or a method of attaching an empty tire 51 to a vehicle at the position shown in FIG. 8, involving the steps of opening the upper liquid valve 65, filling liquid in through the lower liquid valve 66, and, when the air in the liquid space 56 is almost gone, checking the discharge of the liquid from the liquid valve 65, namely recognizing that the air in the liquid space 56 has been changed for the liquid, closing the liquid valve 65, further, and filling the liquid 64 in under pressure up to a desired level to close the liquid valve 66. In the above case, if water is used for the liquid 64, the pressure of supply water may be used as the pressure required for filling it in the pressurized state. The liquid space 56 can also be filled with the liquid 64 in a method of sucking it from the upper valve 65 for liquid with the lower liquid valve 66 previously communicated with a liquid vessel. As a method of filling a small amount of air in the liquid space 56, a small amount of air may additionally be filled under pressure in the liquid space when the space is filled with the liquid 64, and in the case where the air is exchanged with the liquid, the exchange can easily be executed by maintaining a small amount of air therein.

Figure 9:
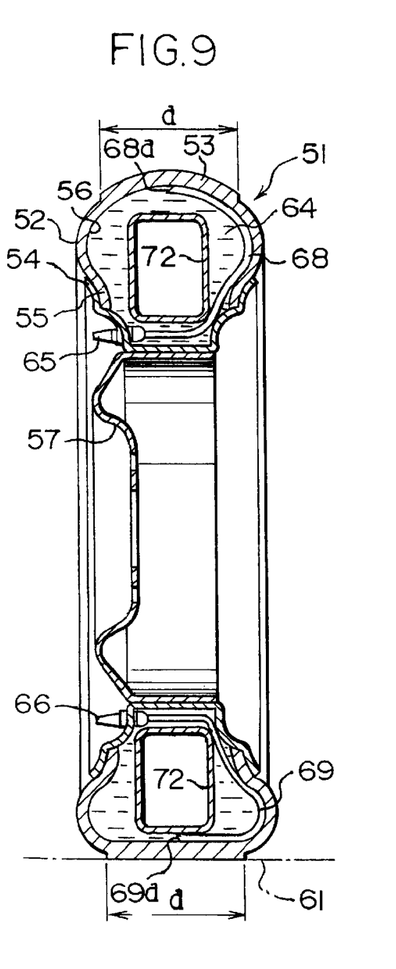
FIG. 9 is a vertical sectional front view showing a tire according to another embodiment.
Figure 10:
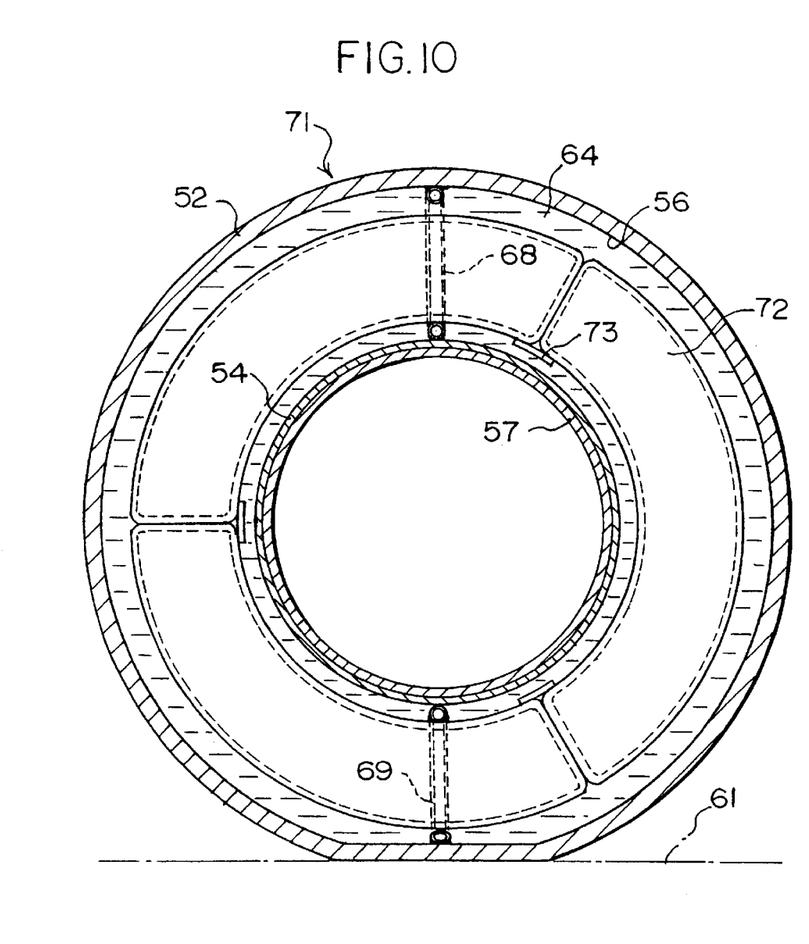
FIG. 10 is a vertical sectional side view of the tire shown in FIG. 9.

FIGS. 9, 10 show a tire according to another embodiment of the present invention. This tire 71 has, to reduce the quantity of liquid 64 to be filled in the depressed liquid space 56, a plastic hollow-molded body 72, which has a specified volume and a form as a solid matter not easily deformed under the used pressure, provided inside the liquid space 56 to maintain the balance at the time of movement of the tire 71. Even if it is possible to make the hollow-molded body 72 as described above into a doughnut-shaped integrally molded body with plastics or the like, it is difficult to insert in the liquid space 56 of the tire 71, and for this reason, the molded body is divided into an arbitrary number of portions as shown in the figure, namely into three portions in the figure to be provided therein. A coupler 73 couples the divided hollow-molded bodies 72 to each other and fixes them so that there will be no obstacle to maintaining balance when the tire 71 moves. In the case where the hollow-molded body 72 is made of plastic, ordinary injection molding or the like, other than blow molding, can be used, while press working or some other working is used in the case where a metal plate is used for a material for the hollow-molded body 72, and in either case, a hollow has to be made inside the molded body as in the plastic hollow-molded body. As a specific method, a molded body is made by making a so-called bellows from a plastic or metal material and winding it into a ring shape and it can also be used as the hollow-molded body 72. The configuration other than the above section is the same as those in the embodiments in FIGS. 7 and 8.

Figure 11:
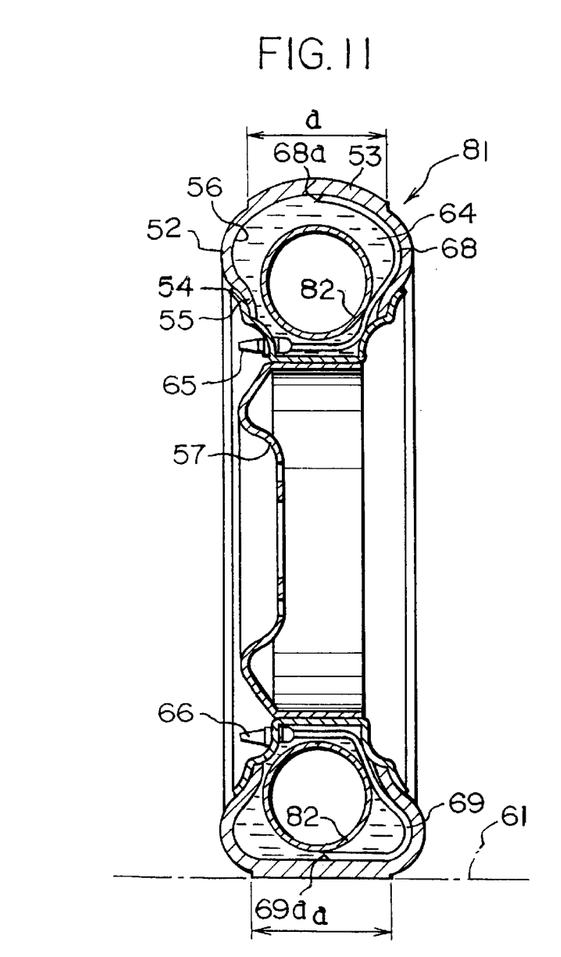
FIG. 11 is a vertical sectional front view showing a tire according to another embodiment.
Figure 12:
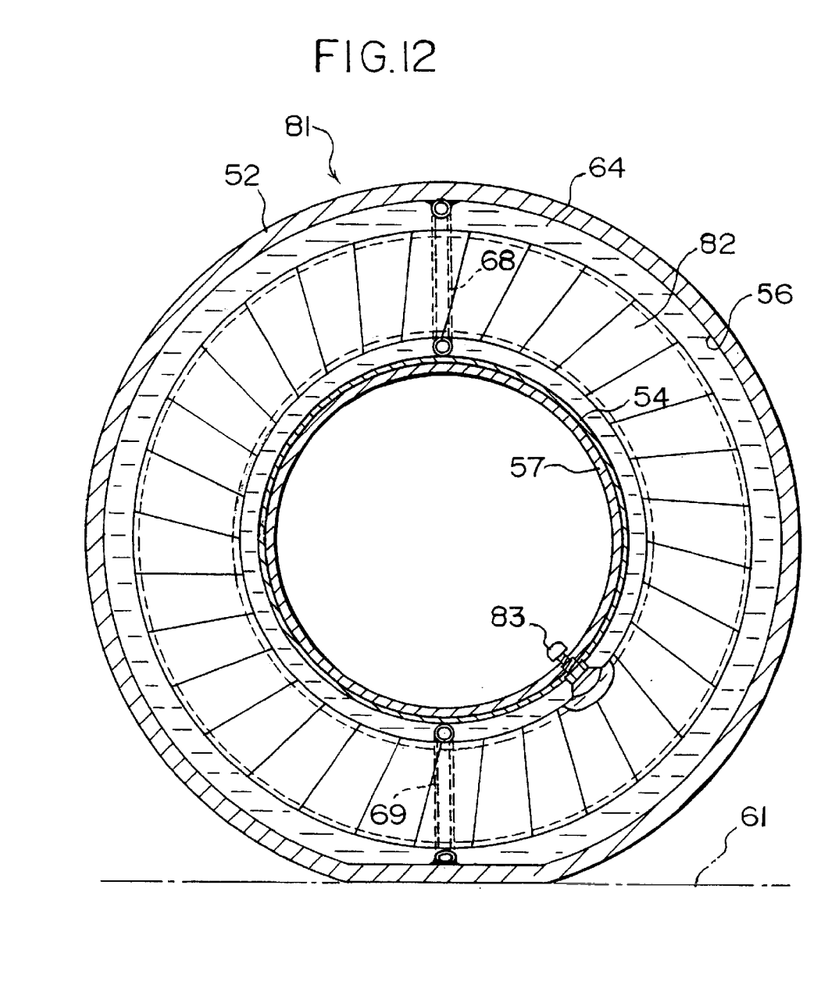
FIG. 12 is a vertical sectional side view of the tire shown in FIG. 11.

FIGS. 11, 12 show a tire according to another embodiment of the invention. This tire 81 has, to reduce the quantity of liquid 64 to be filled in the depressed liquid space 56, a hollow ring-shaped body 82, which has a specified volume and a form as a solid matter not easily deformed under the used pressure, provided therein for the purpose of maintaining balance during rotation of the tire 81. The ring-shaped body 82 shown in the figure is made from a composite material of a rubber and a cloth which is the same as that for the main body 52 of the tire. Although the above material can bend, it is hard for the material to elastically expand and contract. The ring-shaped body 82 made from the material as described above is used by filling air therein having a pressure higher than the ground pressure of the tire 81, for instance, a pressure in the range of from 2.0 to 12 $kg/cm^2$. The reference numeral 83 indicates an air valve for letting air into the ring-shaped body 82 or letting it out therefrom, and similarly to the liquid valves 65, 66, the valve penetrates air-tightly the rim 54 and is fixed thereto. The ring-shaped body 82 is not restricted to the example described above, and a ring-shaped body made of plastic or the like, such as soft polyvinyl chloride or some other material which is soft but is so strong that the expansion thereof can be ignored under the used pressure, can also be used as the ring-shaped body 82. The configuration other than the above section is the same as those in the embodiments in FIGS. 7 and 8.

Figure 13:
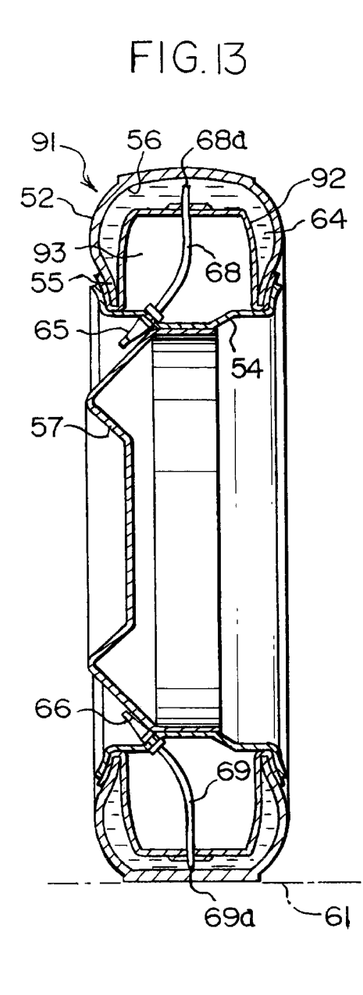
FIG. 13 is a vertical sectional front view showing a tire according to another embodiment.
Figure 14:
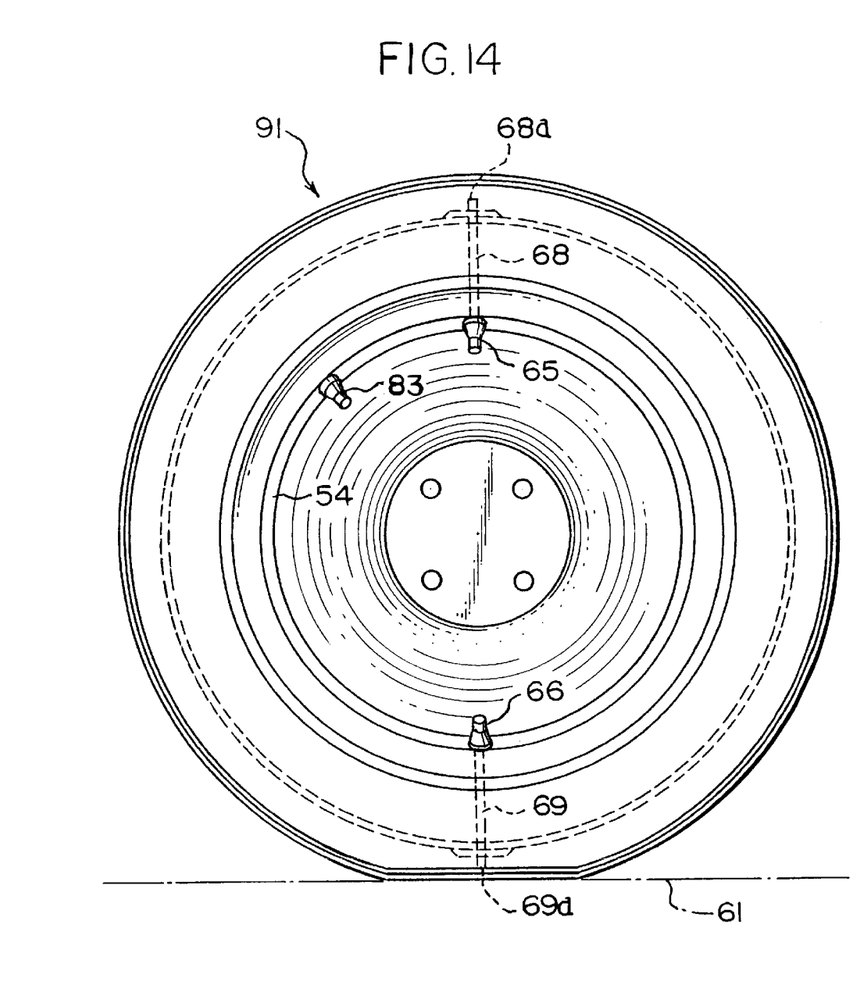
FIG. 14 is a side view of the tire shown in FIG. 13.

FIGS. 13, 14 show a tire according to another embodiment of the present invention. This tire 91 has a toroidal membrane body 92 provided in the liquid space 56, and both toroidal ends of the membrane body are airtightly connected to the inner peripheral wall close to the bead sections 55 of the main body 52 of the tire. In the figure, both ends of the membrane body 92 are airtightly connected to the bead sections 55 so that the bead sections are wound by the ends from the inside to the outside. Accordingly, when the main body 52 of the tire and the rim 54 are combined to each other, a toroidal liquid space 93 is formed in the shielded state by the toroidal membrane body 92 and the rim 54. Air is filled in the liquid space 93 in the pressurized state through the valve 65 air-tightly fixed to the rim 54, but the air pressure required for filling it has to be a pressure exceeding the ground pressure of the tire, namely, the pressure must be in the range of, for instance, from 2.0 to 12 $kg/cm^2$ or more. The material of the toroidal membrane body 92 may be a composite material of a rubber and a cloth, which can bend as. the ring-shaped body 82 but can hardly elastically expand and contract, or is preferably a plastic material or the like, such as soft polyvinyl chloride or some other material which can bend but can ignore the expansion thereof, even under the air pressure as described above. The toroidal membrane body 92 filled with an air pressure exceeding the ground pressure as described above hardly changes its volume even if a pressure equivalent to the ground pressure is given thereto by the liquid filled in the outside of the membrane body. Namely, the toroidal membrane body maintains the specified volume and form as described above, so that the volume of the liquid filled in the air space 93 can be reduced for the same quantity as in the solid matter not easily deformed. The liquid conduits 68 and 69 communicating with the liquid valves 65, 66 air-tightly penetrate the toroidal membrane body 92 at positions entirely opposite to each other to the center of the tire 91 respectively, and the opening sections 68a, 69a, at tips thereof, each extend as far as positions close to the inner periphery of the main body 52 of the tire respectively. It is desirable that areas close to the opening sections 68a, 69a at the tips of the conduits 68, 69 are flexible. The configuration other than the above section is the same as those in the embodiments in FIGS. 7 and 8 as well as in FIGS. 11 and 12.

Figure 15:
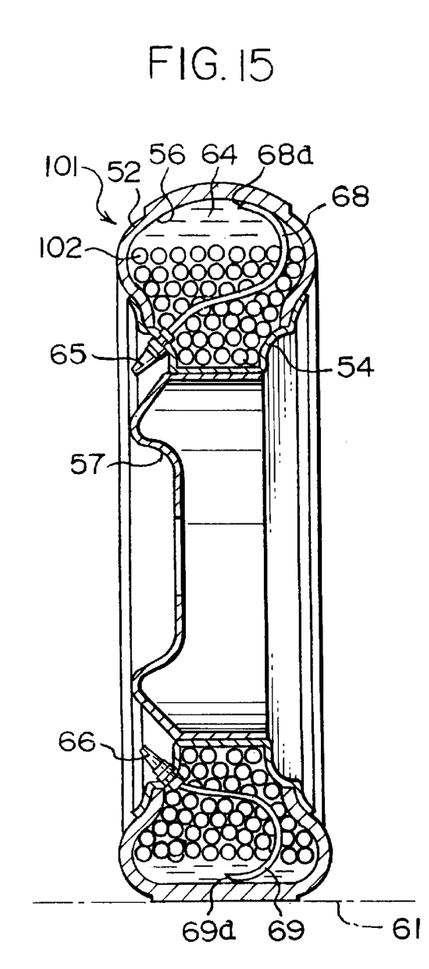
FIG. 15 is a vertical sectional front view showing a tire according to another embodiment.
Figure 16:
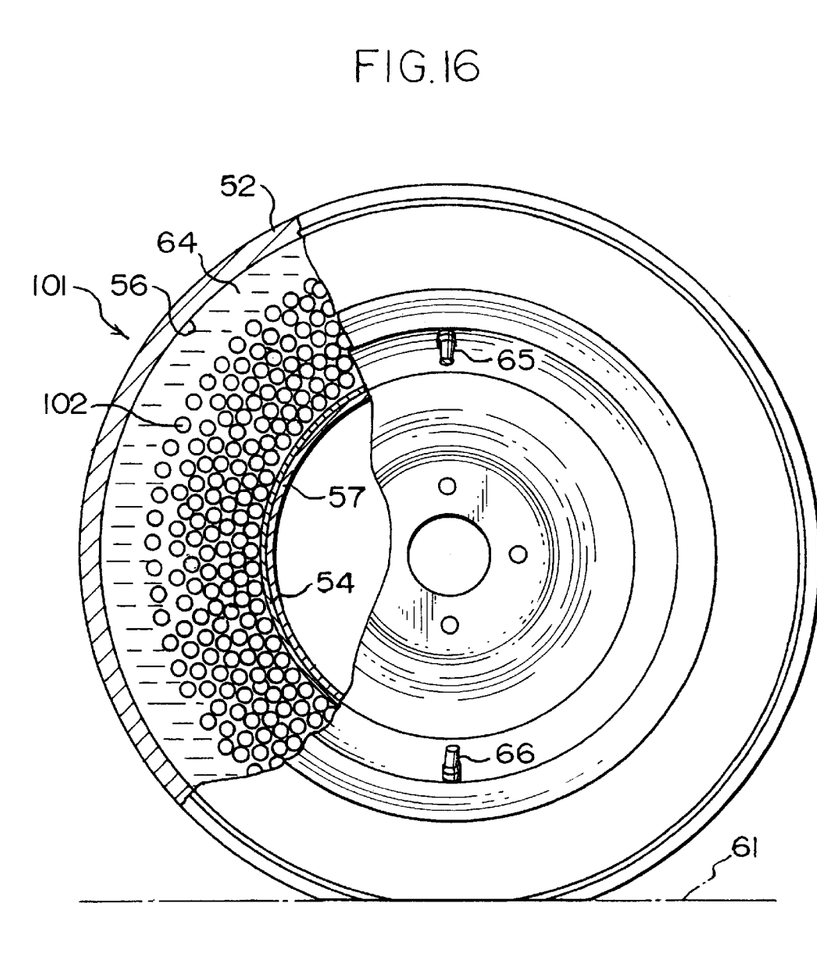
FIG. 16 is a partial cutaway side view of the tire shown in FIG. 15.

FIGS. 15, 16 show a tire according to another embodiment of the present invention. This tire 101 has a number of light and hollow spheres 102 similar to ping-pong balls floating in the liquid 64 in the liquid space 56. The ground pressure of the tire 101 is imposed on the hollow spheres 102 from the outside thereof, so that the spheres have to have sufficient strength toward the pressure so as not to be depressed thereby, and for this reason, an appropriate substance is selected among the plastics to be used. It should be noted that the size of the hollow sphere 102 is not limited to one type, and hollow spheres in various types or sizes can be used by being mixed therein. The hollow spheres 102 gather to the central section of the tire in balance due to the difference of centrifugal force between positions in accordance with movement of the tire 101, so that the movement of the tire 101 goes on smoothly. It is naturally considered that the purpose of using a number of hollow spheres 102 is mainly to reduce the quantity of liquid 64 filled in the tire 101 as described above. The hollow sphere 102 is not restricted to such a hollow sphere as a ping-pong ball and, for instance, a sphere may be made of styrofoam or some other foam material which has excellent water-proof properties, is light, and has enough strength not to be depressed by the pressure of the liquid (liquid pressure is, in general, substantially equal to the ground pressure) imposed thereon from the outside of the sphere, and can also be used in the form of a molded sphere, a block, or a slimshaped piece or the like.

Each of the embodiments shown in the figures is one of the preferred embodiments, and for this reason, the present invention is not limited thereto. It is also possible that embodiments other than the embodiments shown in the figures may be included in the present invention. Some portions of the configurations in each of the embodiments can also be substituted for by some other configurations within the scope of the present invention.

What is claimed is:

1. A vehicle tire comprising a rim, a tire shell made of a rubber composite material and provided on said rim such that a toroidal liquid space formed in the tire shell is enclosed by the tire shell and the rim and a toroidal pneumatic air tube accommodated in the toroidal liquid space, said pneumatic air tube containing air and said toroidal liquid space containing a liquid for supporting a load imposed on the tire and obtaining a desired ground contact area of the tire, wherein said pneumatic air tube has a volume when it is filled with air at a specified pressure for supporting a specified load imposed on the tire which is less than the volume of said liquid space when said tire is depressed to a desired level by a road surface.

2. The vehicle tire according to claim 1, additionally comprising liquid valves for introducing a liquid into or removing a liquid from said toroidal liquid space, said liquid valves being provided at radially opposed positions with respect to said rim.

3. The vehicle tire according to claim 2, additionally comprising liquid conduits provided in the toroidal liquid space and communicating with the liquid valves, said liquid conduits having openings provided at tip portions thereof and provided at an inner peripheral wall of the tire.

4. The vehicle tire according to claim 1, wherein a plurality of toroidal pneumatic air tubes are provided in said first portion of the toroidal liquid space.

5. A vehicle tire comprising a rim, a tire shell provided on said rim such that a toroidal liquid space formed in the tire shell is enclosed by the tire shell and the rim and an elastically expandable toroidal membrane accommodated in the toroidal liquid space, the toroidal membrane having edges thereof airtightly connected to an inner peripheral wall of the tire such that a toroidal air space is formed between the membrane and the rim, said toroidal air space containing air and the toroidal liquid space containing a liquid for supporting a load imposed on the tire and obtaining a desired ground contact area of the tire, wherein said toroidal air space has a volume when it is filled with air at a specified pressure for supporting a specified load imposed on the tire which is less than the volume of said liquid space when said tire is depressed to a desired level by a road surface.

6. The vehicle tire according to claim 5, additionally comprising liquid valves for introducing a liquid into or removing a liquid from said toroidal liquid space, said liquid valves being provided at radially opposed positions with respect to said rim, and liquid conduits provided in the toroidal liquid space and extending through the membrane and the toroidal air space to communicate with the liquid valves, said liquid conduits being in airtight sealing relationship with said membrane and having openings provided at tip portions thereof and provided a an inner peripheral wall of the tire.

7. A vehicle tire comprising a rim, a tire shell provided on said rim such that a toroidal liquid space formed in the tire shell is enclosed by the tire shell and the rim and a toroidal membrane provided in the toroidal liquid space, the toroidal membrane having edges thereof airtightly connected to an inner peripheral wall of the tire adjacent to bead portions thereof such that a toroidal air space is formed between the membrane and the rim, said toroidal air space containing air and said toroidal liquid space containing a liquid for supporting a load imposed on the tire and obtaining a desired ground contact area of the tires, wherein said toroidal air space has a volume when it is filled with air at a specified pressure for supporting a specified load imposed on the tire which is less than the volume of said liquid space when said tire is depressed to a desired level by a road surface.

* * * * *

UNITED STATES PATENT AND TRADEMARK OFFICE
CERTIFICATE OF CORRECTION

PATENT NO  : 5 938 868
DATED      : August 17, 1999
INVENTOR(S): Isago MIURA et al It is certified that error appears in the above-identified patent and that said Letters Patent is hereby corrected as shown below:

Column 10, line 5; change "area of the tires," to
---area of the tire,---.

Signed and Sealed this

Ninth Day of May, 2000

Attest:

Q. TODD DICKINSON

*Attesting Officer*          *Director of Patents and Trademarks*